US009434195B2

(12) United States Patent
Ozeki

(10) Patent No.: US 9,434,195 B2
(45) Date of Patent: Sep. 6, 2016

(54) PRINTING INSTRUCTION APPARATUS, PRINTING SYSTEM, PRINTING INSTRUCTION METHOD, AND COMPUTER READABLE MEDIUM

(71) Applicant: FUJI XEROX CO., LTD., Tokyo (JP)

(72) Inventor: Kazunori Ozeki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/606,557

(22) Filed: Jan. 27, 2015

(65) Prior Publication Data

US 2016/0067990 A1 Mar. 10, 2016

(30) Foreign Application Priority Data

Sep. 8, 2014 (JP) ................................ 2014-182154

(51) Int. Cl.
*B41J 29/38* (2006.01)
(52) U.S. Cl.
CPC ...................... *B41J 29/38* (2013.01)
(58) Field of Classification Search
CPC ........................................................ B41J 29/38
USPC ..................... 358/1.13, 1.15, 1.16
See application file for complete search history.

(56) References Cited

U.S. PATENT DOCUMENTS

| 5,727,135 | A * | 3/1998 | Webb ................... | G06F 3/1204 358/1.14 |
| 7,328,224 | B2 * | 2/2008 | Kawamoto ............. | G06F 3/1205 |
| 7,558,916 | B2 * | 7/2009 | Chikusa ................ | G06F 3/0617 711/111 |
| 8,730,488 | B2 | 5/2014 | Kakitsuba | |
| 8,817,276 | B2 * | 8/2014 | Yamakawa ............ | G06K 15/02 358/1.1 |
| 2008/0068635 | A1 * | 3/2008 | Asano ................... | G06F 3/1204 358/1.13 |
| 2010/0007905 | A1 * | 1/2010 | Murashita ............. | G06F 3/1205 358/1.13 |
| 2012/0008166 | A1 * | 1/2012 | Noto et al. ............ | G06F 3/1204 358/1.15 |

FOREIGN PATENT DOCUMENTS

JP 2011-243067 A 12/2011

* cited by examiner

*Primary Examiner* — Allen H Nguyen
(74) *Attorney, Agent, or Firm* — Sughrue Mion, PLLC

(57) ABSTRACT

A printing instruction apparatus includes a definition unit, a group storage unit, a difference storage unit, and a determination unit. The definition unit defines a function of a printing apparatus. The group storage unit stores, for each of groups of printing apparatuses categorized in accordance with a predetermined rule, function information indicating a function provided in a printing apparatus which belongs to the group from among functions defined by the definition unit. The difference storage unit stores, for each apparatus type, difference information indicating a group to which the apparatus type belongs and a difference between apparatus types of printing apparatuses. The determination unit determines a function of each apparatus type, based on the function information corresponding to the apparatus type which is identified by the group indicated by the difference information.

11 Claims, 12 Drawing Sheets

FIG. 3

| ITEM | INTER-TYPE DIFFERENCE INFORMATION | | |
|---|---|---|---|
| | GENERATION | COLOR/MONOCHROME | MFP/SFP |
| APPARATUS TYPE A | 1 | COLOR | MFP |
| APPARATUS TYPE B | 1 | MONOCHROME | MFP |
| APPARATUS TYPE C | 1 | COLOR | SFP |
| APPARATUS TYPE D | 2 | COLOR | MFP |
| APPARATUS TYPE E | 2 | MONOCHROME | MFP |
| APPARATUS TYPE F | 2 | COLOR | SFP |
| APPARATUS TYPE G | 3 | COLOR | MFP |
| APPARATUS TYPE H | 3 | MONOCHROME | MFP |
| APPARATUS TYPE I | 3 | COLOR | SFP |

FIG. 4

| ITEM | INTRA-GENERATION INFORMATION | | | | | |
|---|---|---|---|---|---|---|
| | GENERATION | FUNCTION VARIABLE FUNCTION LIST | | | | SUPPORT CONDITIONS |
| | | SIZE | COLOR MODE <CONDITION 1> | COLLECTIVE OUTPUT <VARIABLE FUNCTION> | STAMP <VARIABLE FUNCTION> | FAX <CONDITION 2> | |
| INTRA-GENERATION INFORMATION 1 | 1 | ○ | ○ | ○ | — | ○ | <CONDITION 1> SUPPORT ONLY WHEN "COLOR" IS INDICATED IN ITEM OF "COLOR/MONOCHROME" <CONDITION 2> SUPPORT ONLY WHEN "MFP" IS INDICATED IN ITEM OF "MFP/SFP" |
| INTRA-GENERATION INFORMATION 2 | 2 | ○ | ○ | ○ | — | ○ | |
| INTRA-GENERATION INFORMATION 3 | 3 | ○ | ○ | ○ | ○ | ○ | |

FIG. 5

| ITEM | VARIABLE FUNCTION INFORMATION | | |
|---|---|---|---|
| | VARIANT 1 | VARIANT 2 | SELECTION CONDITIONS |
| COLLECTIVE OUTPUT | 4 PAGES | 8 PAGES | 4 PAGES WHEN "1" IS INDICATED IN ITEM OF "GENERATION"<br>8 PAGES WHEN "2" OR "3" IS INDICATED IN ITEM OF "GENERATION" |
| STAMP | FOR COLOR | FOR MONOCHROME | "FOR COLOR" WHEN "COLOR" IS INDICATED IN ITEM OF "COLOR/MONOCHROME"<br>"FOR MONOCHROME" WHEN "MONOCHROME" IS INDICATED IN ITEM OF "COLOR/MONOCHROME" |

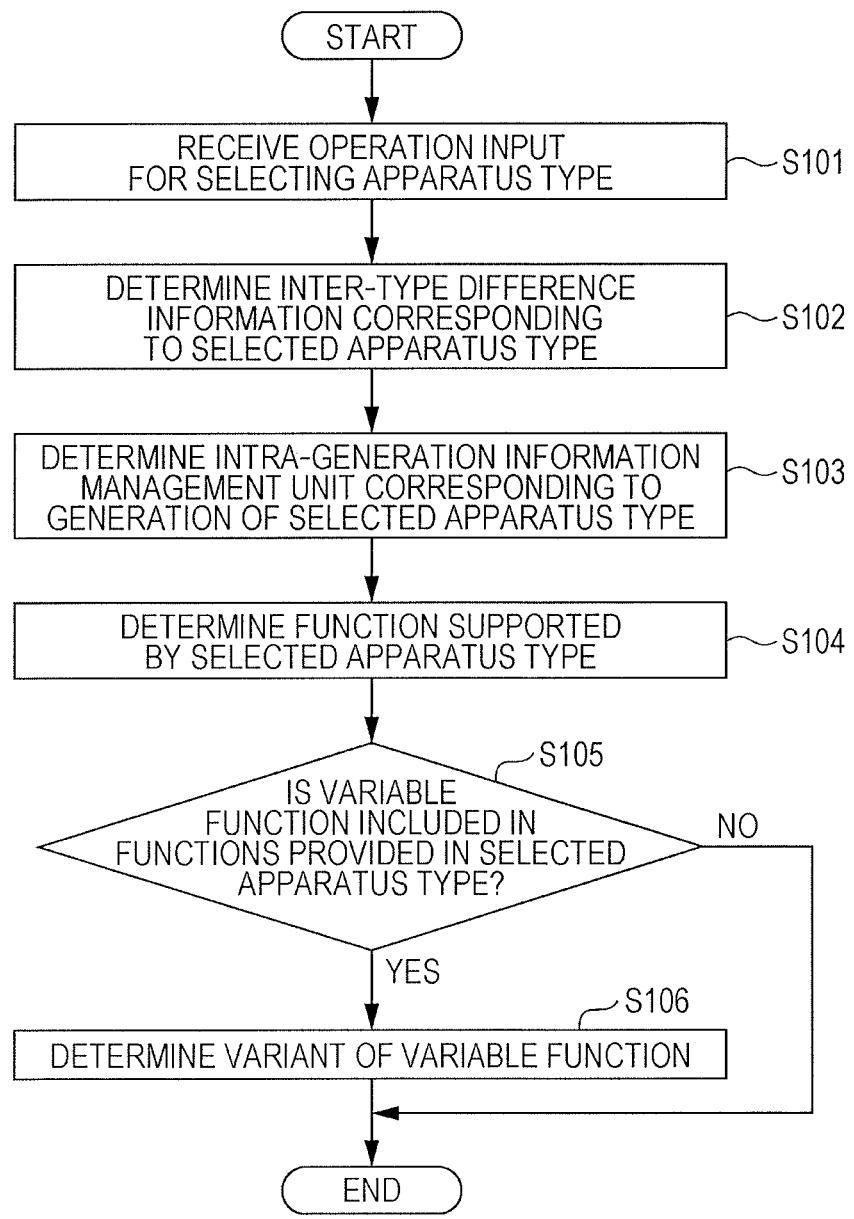

FIG. 7

| APPARATUS TYPE | INTER-TYPE DIFFERENCE INFORMATION | GENERATION | INTRA-GENERATION INFORMATION |
|---|---|---|---|
| APPARATUS TYPE A | APPARATUS TYPE A | 1 | INTRA-GENERATION INFORMATION 1 |
| APPARATUS TYPE B | APPARATUS TYPE B | 1 | INTRA-GENERATION INFORMATION 1 |
| APPARATUS TYPE C | APPARATUS TYPE C | 1 | INTRA-GENERATION INFORMATION 1 |
| APPARATUS TYPE D | APPARATUS TYPE D | 2 | INTRA-GENERATION INFORMATION 2 |
| APPARATUS TYPE E | APPARATUS TYPE E | 2 | INTRA-GENERATION INFORMATION 2 |
| APPARATUS TYPE F | APPARATUS TYPE F | 2 | INTRA-GENERATION INFORMATION 2 |
| APPARATUS TYPE G | APPARATUS TYPE G | 3 | INTRA-GENERATION INFORMATION 3 |
| APPARATUS TYPE H | APPARATUS TYPE H | 3 | INTRA-GENERATION INFORMATION 3 |
| APPARATUS TYPE I | APPARATUS TYPE I | 3 | INTRA-GENERATION INFORMATION 3 |

FIG. 8

| APPARATUS TYPE | INTRA-GENERATION INFORMATION | SIZE | COLOR MODE | COLLECTIVE OUTPUT ⟨VARIABLE FUNCTION⟩ | STAMP ⟨VARIABLE FUNCTION⟩ | FAX |
|---|---|---|---|---|---|---|
| APPARATUS TYPE A | INTRA-GENERATION INFORMATION 1 | ○ | ○ | ○ | — | ○ |
| APPARATUS TYPE B | INTRA-GENERATION INFORMATION 1 | ○ | — | ○ | — | ○ |
| APPARATUS TYPE C | INTRA-GENERATION INFORMATION 1 | ○ | ○ | ○ | — | — |
| APPARATUS TYPE D | INTRA-GENERATION INFORMATION 2 | ○ | ○ | ○ | — | ○ |
| APPARATUS TYPE E | INTRA-GENERATION INFORMATION 2 | ○ | — | ○ | — | ○ |
| APPARATUS TYPE F | INTRA-GENERATION INFORMATION 2 | ○ | ○ | ○ | — | — |
| APPARATUS TYPE G | INTRA-GENERATION INFORMATION 3 | ○ | ○ | ○ | ○ | ○ |
| APPARATUS TYPE H | INTRA-GENERATION INFORMATION 3 | ○ | — | ○ | ○ | ○ |
| APPARATUS TYPE I | INTRA-GENERATION INFORMATION 3 | ○ | ○ | ○ | ○ | — |

FIG. 9

| APPARATUS TYPE | COLLECTIVE OUTPUT | STAMP |
|---|---|---|
| APPARATUS TYPE A | 4 PAGES | — |
| APPARATUS TYPE B | 4 PAGES | — |
| APPARATUS TYPE C | 4 PAGES | — |
| APPARATUS TYPE D | 8 PAGES | — |
| APPARATUS TYPE E | 8 PAGES | — |
| APPARATUS TYPE F | 8 PAGES | — |
| APPARATUS TYPE G | 8 PAGES | FOR COLOR |
| APPARATUS TYPE H | 8 PAGES | FOR MONOCHROME |
| APPARATUS TYPE I | 8 PAGES | FOR COLOR |

FIG. 10

| APPARATUS TYPE | GENERATION | COLOR/MONOCHROME | MFP/SFP | SIZE | COLOR MODE | COLLECTIVE OUTPUT | STAMP | FAX |
|---|---|---|---|---|---|---|---|---|
| APPARATUS TYPE A | 1 | COLOR | MFP | ○ | ○ | 4 PAGES | — | ○ |
| APPARATUS TYPE B | 1 | MONOCHROME | MFP | ○ | — | 4 PAGES | — | ○ |
| APPARATUS TYPE C | 1 | COLOR | SFP | ○ | ○ | 4 PAGES | — | — |
| APPARATUS TYPE D | 2 | COLOR | MFP | ○ | ○ | 8 PAGES | — | ○ |
| APPARATUS TYPE E | 2 | MONOCHROME | MFP | ○ | — | 8 PAGES | — | ○ |
| APPARATUS TYPE F | 2 | COLOR | SFP | ○ | ○ | 8 PAGES | — | — |
| APPARATUS TYPE G | 3 | COLOR | MFP | ○ | ○ | 8 PAGES | FOR COLOR | ○ |
| APPARATUS TYPE H | 3 | MONOCHROME | MFP | ○ | — | 8 PAGES | FOR MONOCHROME | ○ |
| APPARATUS TYPE I | 3 | COLOR | SFP | ○ | ○ | 8 PAGES | FOR COLOR | — |

PRINTING INSTRUCTION APPARATUS, PRINTING SYSTEM, PRINTING INSTRUCTION METHOD, AND COMPUTER READABLE MEDIUM

CROSS-REFERENCE TO RELATED APPLICATIONS

This application is based on and claims priority under 35 USC 119 from Japanese Patent Application No. 2014-182154 filed Sep. 8, 2014.

BACKGROUND (i) Technical Field

The present invention relates to a printing instruction apparatus, a printing system, a printing instruction method, and a computer readable medium.

(ii) Related Art

In a printing instruction apparatus which supports printing apparatuses of plural apparatus types, with a configuration in which functions provided in the individual apparatus types of printing apparatuses are defined for the individual apparatus types and the contents of the individual functions are defined for the individual functions, the number of combinations of apparatus types and functions increases, and therefore the amount of operation required for operation guarantee may increase.

SUMMARY

According to an aspect of the invention, there is provided a printing instruction apparatus including a definition unit, a group storage unit, a difference storage unit, and a determination unit. The definition unit defines a function of a printing apparatus. The group storage unit stores, for each of groups of printing apparatuses categorized in accordance with a predetermined rule, function information indicating a function provided in a printing apparatus which belongs to the group from among functions defined by the definition unit. The difference storage unit stores, for each apparatus type, difference information indicating a group to which the apparatus type belongs and a difference between apparatus types of printing apparatuses. The determination unit determines a function of each apparatus type, based on the function information corresponding to the apparatus type which is identified by the group indicated by the difference information.

BRIEF DESCRIPTION OF THE DRAWINGS

Exemplary embodiments of the present invention will be described in detail based on the following figures, wherein:

FIG. 3 is a diagram illustrating an example of inter-type difference information;

FIG. 4 is a diagram illustrating an example of intra-generation information;

FIG. 5 is a diagram illustrating an example of variable function information;

FIG. 6 is a flowchart illustrating an example of a process for determining a function provided in an image forming apparatus;

FIG. 7 is a diagram for explaining an example of intra-generation information corresponding to a selected apparatus type;

FIG. 8 is a diagram for explaining an example of a function provided in a selected apparatus type;

FIG. 9 is a diagram for explaining an example of a variable function provided in a selected apparatus type;

FIG. 10 is a diagram illustrating an example of specifications of individual apparatus types of image forming apparatuses;

DETAILED DESCRIPTION

Overall Configuration of System

Figure 1:
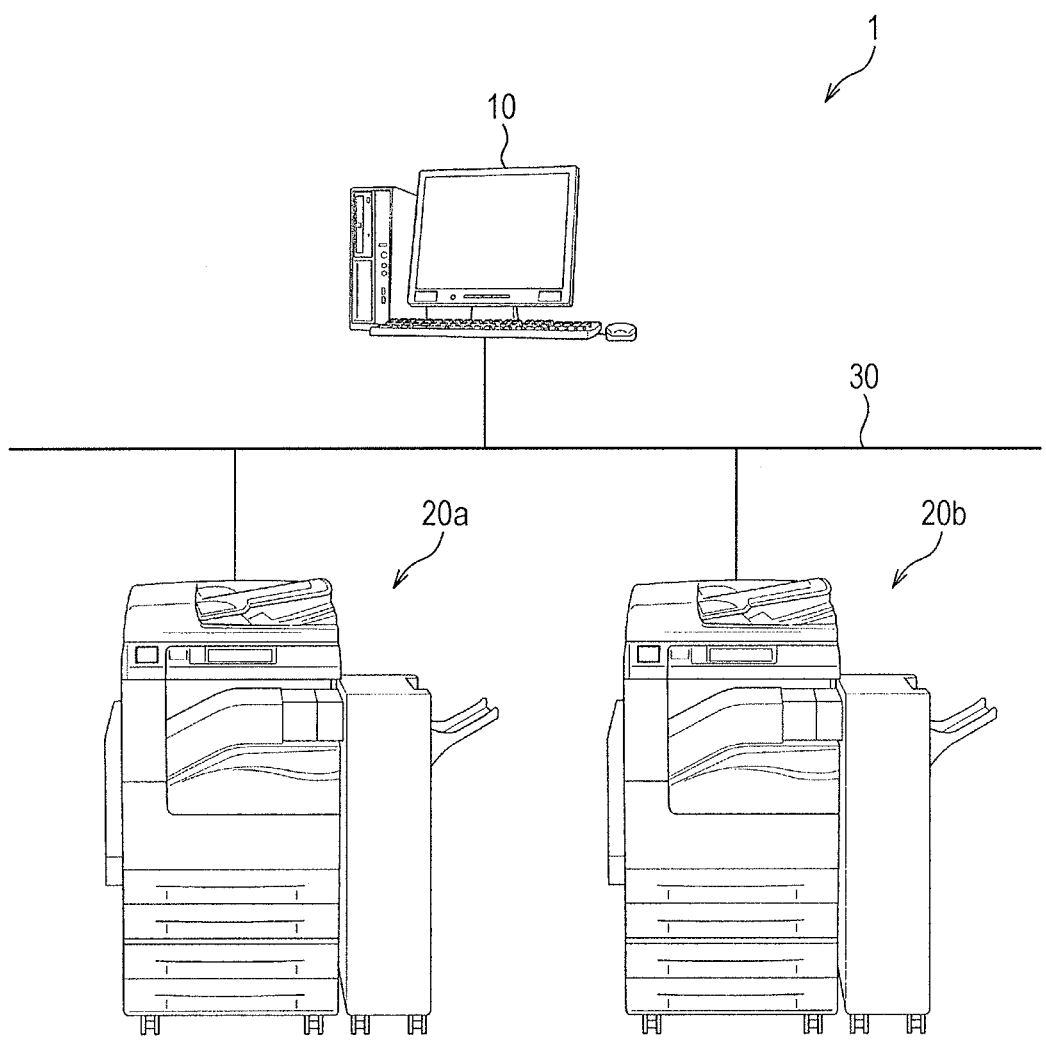
FIG. 1 is a diagram illustrating an example of a schematic configuration of an image forming system according to an exemplary embodiment.

First, the overall configuration of an image forming system 1 according to an exemplary embodiment will be explained. FIG. 1 is a diagram illustrating an example of a schematic configuration of the image forming system 1 according to an exemplary embodiment. As illustrated in FIG. 1, the image forming system 1, which is an example of a printing system, includes a terminal apparatus 10, an image forming apparatus 20a, and an image forming apparatus 20b which are connected to one another via a network 30. Although the image forming apparatus 20a and the image forming apparatus 20b are illustrated in FIG. 1, they will be referred to as image forming apparatuses 20 when no distinction is made between them. Although the two image forming apparatuses 20 are illustrated in the example of FIG. 1, three or more image forming apparatuses 20 may be provided.

The terminal apparatus 10, which is an example of a printing instruction apparatus, is a computer apparatus which is operated by a user for printing documents. The terminal apparatus 10 issues an instruction for printing to an image forming apparatus 20 in accordance with a user operation. For example, a personal computer (PC) may be used as the terminal apparatus 10.

The image forming apparatuses 20, which are an example of printing apparatuses, form an image on a recording medium, such as paper, and perform printing processing. Apparatuses which only have a printing function may be used as the image forming apparatuses 20. However, apparatuses which have other image processing functions including a copying function, a scanning function, and a facsimile function as well as the printing function may be used.

The network 30 is a communication unit used for information communication between the terminal apparatus 10 and the image forming apparatuses 20. For example, a local area network (LAN) or the Internet may be used as the network 30.

Functional Configuration of Terminal Apparatus

Figure 2:
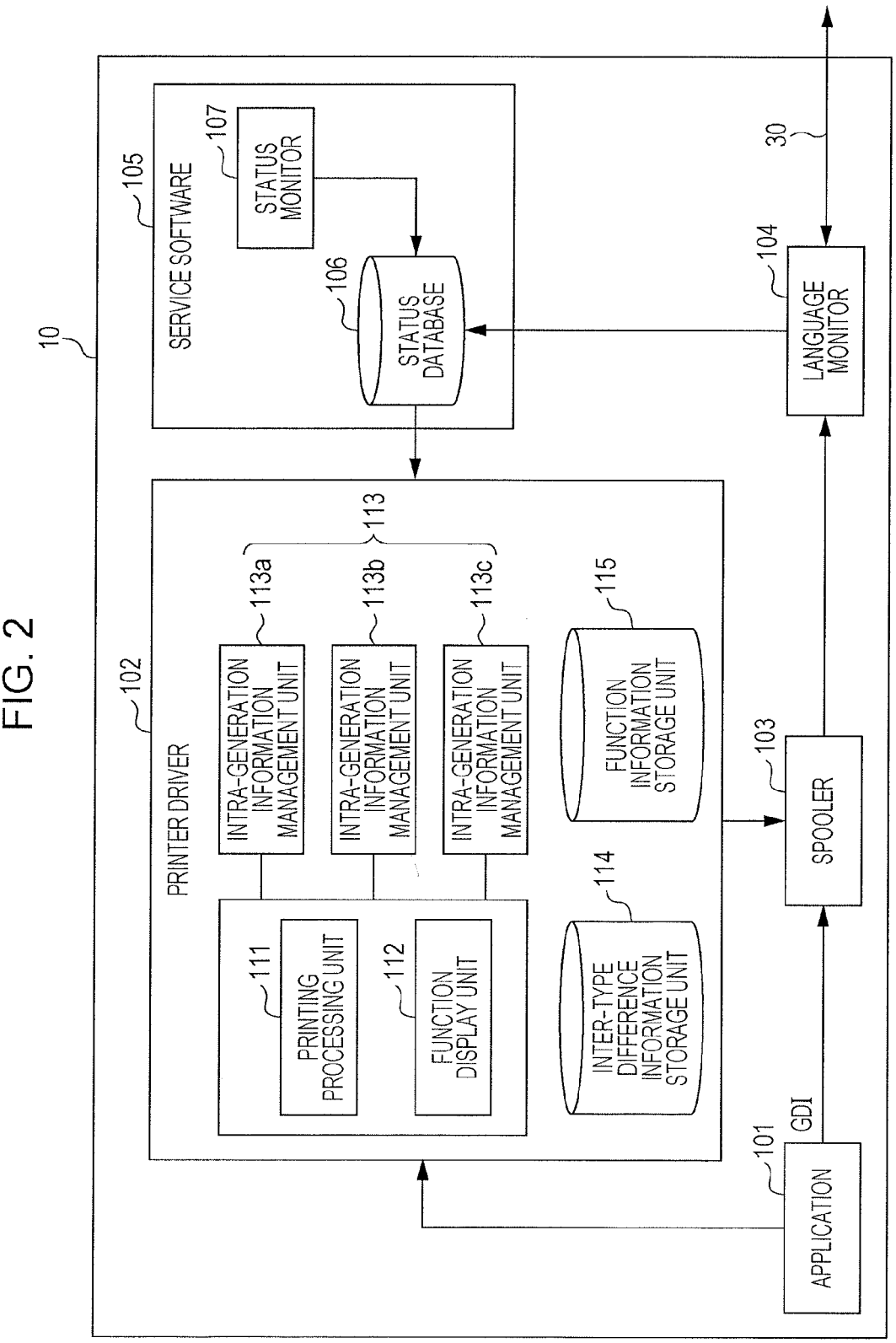
FIG. 2 is a block diagram illustrating an example of the functional configuration of a terminal apparatus according to an exemplary embodiment.

Next, a functional configuration of the terminal apparatus 10 will be explained. FIG. 2 is a block diagram illustrating an example of the functional configuration of the terminal apparatus 10 according to an exemplary embodiment. In the terminal apparatus 10, an application program (hereinafter, referred to as an "application") 101, a printer driver 102, a spooler 103, a language monitor 104, and service software 105 operate.

The application 101 is a program which generates image data to be printed and retrieves generated image data, in accordance with a user operation.

The printer driver 102 is a program for transmitting a print job to the image forming apparatus 20 via the spooler 103 and the language monitor 104 and controlling output of documents from the image forming apparatus 20 when a request for printing based on image data is received from the application 101. The print job mentioned above represents data which includes image data to be printed and a control instruction describing settings for printing processing and which serves as a unit of printing processing performed by the image forming apparatus 20. The details of the printer driver 102 will be described later.

The spooler 103 is a program for temporarily storing a print job to be output to the image forming apparatus 20 via a graphic device interface (GDI) as an electronic document rendering instruction and retrieving and transmitting the print job to the language monitor 104 in accordance with a predetermined rule, in response to a printing instruction from the printer driver 102.

The language monitor 104 communicates bi-directionally with the image forming apparatus 20. The language monitor 104 monitors the status of the image forming apparatus 20 and transmits a print job to the image forming apparatus 20.

The service software 105 acquires operation information of the image forming apparatus 20 and notifies a user of the operation information. The service software 105 functions as a status database 106 and a status monitor 107.

The status database 106 stores operation information of the image forming apparatus 20 notified from the language monitor 104.

The status monitor 107 performs display on a display mechanism 15 (described later) of the terminal apparatus 10 or the like, based on operation information of the image forming apparatus 20 stored in the status database 106, at preset time intervals.

Explanation of Printer Driver

Next, the details of the printer driver 102 will be explained below.

The printer driver 102, as a single unit, corresponds to the image forming apparatuses 20 of the plural apparatus types and is able to function as a so-called universal printer driver (hereinafter, referred to as a universal driver) which is able to provide functions equivalent to drivers dedicated to various apparatus types. By installing the printer driver 102 into the terminal apparatus 10, printing is able to be performed by the image forming apparatuses 20 of different apparatus types. Furthermore, when an image forming apparatus 20 different from, for example, the image forming apparatuses 20a and 20b, which have already been introduced, is newly introduced into the image forming system 1, there is no need to separately install a new printer driver.

The terminal apparatus 10 includes, as functions of the printer driver 102, a printing processing unit 111, a function display unit 112, an intra-generation information management unit 113, an inter-type difference information storage unit 114, and a function information storage unit 115.

The printing processing unit 111, which is an example of a printing instruction unit, is provided as a function unit common to various apparatus types of the image forming apparatuses 20. The printing processing unit 111 generates a print job for instructing the image forming apparatus 20 for printing and outputs the generated print job.

The function display unit 112, which is an example of a display, is provided as a function unit common to various apparatus types of the image forming apparatuses 20. The function display unit 112 functions as a user interface with a user. In this example, for example, when a user intends to use an image forming apparatus 20, the function display unit 112 receives an operation input for selecting the apparatus type of the image forming apparatus 20 to be used. For reception of an operation input for selecting an apparatus type, for example, the function display unit 112 displays on the display mechanism 15 (described later) of the terminal apparatus 10 a list of apparatus types of the image forming apparatuses 20 existing in the image forming system 1, and receives from a user an operation input for selecting an apparatus type via the display mechanism 15. Furthermore, for example, the function display unit 112 displays information of various functions provided in the image forming apparatus 20 of the apparatus type selected by the user and receives from the user an operation input for performing printing via the display mechanism 15.

The intra-generation information management unit 113, which is an example of a group storage unit and a determination unit, exists for each generation to which an image forming apparatus 20 belongs. The intra-generation information management unit 113 stores information defining a function which is likely to be provided in the image forming apparatus 20 belonging to the generation (hereinafter, referred to as intra-generation information). In the example illustrated in FIG. 2, the intra-generation information management unit 113 for three generations are illustrated as intra-generation information management units 113a, 113b, and 113c. The generation mentioned above represents a group of image forming apparatuses 20 of plural apparatus types having the same development time or close development times. It is considered that the image forming apparatuses 20 belonging to the same generation are highly likely to have close development times and have the same function. In this exemplary embodiment, a generation is used as an example of a group of printing apparatuses categorized in accordance with a predetermined rule.

For example, the intra-generation information management unit 113 for "generation 1" defines a list of functions that are likely to be provided in the image forming apparatuses 20 belonging to the "generation 1" as intra-generation information. In the case where an image forming apparatus 20 of a new generation is added within the image forming system 1, an intra-generation information management unit 113 for the new generation is added and intra-generation information for the new generation is stored in the added intra-generation information management unit 113. Furthermore, when the contents and behavior of an existing function in an apparatus type of a new generation are changed from those of an existing apparatus type, instead of modifying the existing function, a new function is added and reflected only in the new intra-generation information management unit 113. Thus, the change does not affect intra-generation information of the other generations. In this exemplary embodiment, intra-generation information is used as an example of function information.

The inter-type difference information storage unit 114, which is an example of a difference storage unit, stores, for each apparatus type, information defining a difference between apparatus types of the image forming apparatuses 20 (hereinafter, referred to as inter-type difference information). For example, inter-type difference information defines, for each apparatus type of the image forming apparatus 20, information indicating whether or not the apparatus type has a function for outputting images in color to paper (hereinafter, referred to as a color function), whether or not the apparatus type has a facsimile function, and the like. The inter-type difference information also includes information indicating to which generation each apparatus type of the image forming apparatus 20 belongs. In this exemplary embodiment, inter-type difference information is used as an example of difference information.

The function information storage unit 115, which is an example of a definition unit and a variable function storage unit, stores, for all the functions that are likely to be provided in the image forming apparatus 20, information which specifically defines the contents of the functions. For example, the function display unit 112 performs display corresponding to a function selected to be used, based on information of individual functions stored in the function information storage unit 115. For example, the printing processing unit 111 generates a print job for instructing printing with a function selected to be used, based on information of individual functions stored in the function information storage unit 115.

The function information storage unit 115 stores information (hereinafter, referred to as variable function information) which defines a function (hereinafter, referred to as variable function) including the contents of different functions. For example, variable function information defines, regarding a function for outputting plural pages onto a single sheet of paper (hereinafter, referred to as a collective output function), specific contents, such as a function for collectively outputting four pages onto a single sheet of paper and a function for collectively outputting eight pages onto a single sheet of paper. In the case where an image forming apparatus 20 of a specific type has a variable function, the specific contents that functions defined in the variable function information embody (support) are determined based on variable function information and inter-type difference information of the specific apparatus type. The details of the variable function information will be described later.

In addition, when receiving from a user an operation input for selecting an apparatus type to be used, the function display unit 112 acquires from the inter-type difference information storage unit 114 inter-type difference information of the apparatus type selected by the user, and identifies the generation to which the apparatus type belongs. After identifying the generation to which the selected apparatus type belongs, the function display unit 112 determines the intra-generation information management unit 113 corresponding to the identified generation. Then, the determined intra-generation information management unit 113 determines a function supported by the apparatus type, based on stored intra-generation information (that is, intra-generation information corresponding to the generation to which the selected apparatus type belongs) and the inter-type difference information for the apparatus type.

That is, in order that the printer driver 102 operates as a printer driver for a specific apparatus type, inter-type difference information for the specific apparatus type is set for intra-generation information for the generation to which the specific apparatus type belongs. Furthermore, in the case where a variable function is included in a function supported by the selected apparatus type, the intra-generation information management unit 113 determines, based on inter-type difference information of the apparatus type and variable function information, the contents of a function to be supported as the variable function. The details of the inter-type difference information, the variable function information, and the intra-generation information will be described later.

Explanation of Inter-Type Difference Information

Next, inter-type difference information will be explained. FIG. 3 is a diagram illustrating an example of inter-type difference information. In the example illustrated in FIG. 3, inter-type difference information defined with regard to nine apparatus types: apparatus types A to I, for items, such as "generation", "color/monochrome", and "MFP/SFP", is illustrated. "Generation" represents a generation to which each apparatus type belongs. "Color/monochrome" represents whether or not each apparatus type has a color function. "Color" indicates that an apparatus type has a color function. "Monochrome" indicates that an apparatus type does not have a color function and performs printing in black and white. "MFP/SFP" represents whether or not each apparatus type has an image processing function, such as a facsimile function, which is not a printing function. "MFP" indicates that an apparatus type has an image processing function which is not a printing function. "SFP" indicates that an apparatus type does not have an image processing function which is not a printing function.

In the inter-type difference information illustrated in FIG. 3, for example, the apparatus types A to C are in their generation "1", the apparatus types D to F are in their generation "2", and the apparatus types G to I are in their generation "3". Furthermore, for example, the apparatus type A has the color function and a different image processing function. Meanwhile, for example, the apparatus type B, which is in its generation "1" like the apparatus A, does not have the color function but has a different image processing function. Furthermore, for example, the apparatus type D, which is in its generation "2" unlike the apparatus A, has the color function and a different image processing function.

As described above, inter-type difference information indicates a generation to which each apparatus type belongs and information regarding a configuration which varies according to the apparatus type.

Explanation of Intra-Generation Information

Next, intra-generation information will be explained. FIG. 4 is a diagram illustrating an example of intra-generation information. In the example illustrated in FIG. 4, intra-generation information for the generation "1" is defined as "intra-generation information 1", intra-generation information for the generation "2" is defined as "intra-generation information 2", and intra-generation information for the generation "3" is defined as "intra-generation information 3". Intra-generation information for each generation defines the contents of a function that is likely to be provided in the image forming apparatus 20 belonging to the generation. Furthermore, in the example illustrated in FIG. 4, individual pieces of intra-generation information are illustrated. However, individual pieces of intra-generation information (intra-generation information for the generation "1", intra-generation information for the generation "2", and intra-generation information for the generation "3") are stored in corresponding intra-generation information management units 113.

"Size" represents whether or not an apparatus type belonging to each generation has a function for selecting the size of paper. "Color mode" represents whether or not an apparatus type belonging to each generation is able to select color printing. "Collective output" represents whether or not an apparatus type belonging to each generation has a collective output function. "Stamp" represents whether or not an apparatus type belonging to each generation has a function for adding a predetermined image to output paper (hereinafter, referred to as a stamp function). Predetermined images include, for example, an image indicating that the printing contents are confidential, an image representing a company to which a user belongs, and the like. "Fax" represents whether or not an apparatus type belonging to each generation has a facsimile function.

Furthermore, intra-generation information defines support conditions to be met for supporting individual functions. In the example illustrated in FIG. 4, for "color mode" and "FAX", condition 1 and condition 2 are set, respectively, as support conditions. The condition 1 set for "color mode" defines that only the case where "color" is indicated in the item "color/monochrome" is supported. That is, the condition 1 defines that an apparatus type for which the item "color/monochrome" indicates "color" in the inter-type difference information supports the function of "color mode" and is therefore able to select color printing. Furthermore, the condition 2 set for "FAX" defines that only the case where "MFP" is indicated in the item "MFP/SFP" in the inter-type difference information is supported. That is, the condition 2 defines that an apparatus type for which the item "MFP/SFP" indicates "MFP" in the inter-type difference information supports the facsimile function as the function of "FAX".

As described above, for a function for which a support condition is set, a determination as to whether or not individual apparatus types have the function is performed based on the contents of inter-type difference information.

Furthermore, information indicating that the collective output function represented by "collective output" and the stamp function represented by "stamp" are variable functions is added to the collective output function and the stamp function. For the above variable functions, the specific contents of functions are defined in variable function information.

In the example illustrated in FIG. 4, for example, in the intra-generation information 1 for the generation "1", a circle mark is found in "size", "color mode", "collective output", and "FAX". Thus, the intra-generation information 1 indicates that the apparatus type belonging to the generation "1" is likely to have the function for selecting the size of paper, the color function, the collective output function, and the facsimile function. However, since support conditions are set for "color mode" and "FAX", only an apparatus type that belongs to the generation "1" and meets the corresponding condition has the color function or the facsimile function. Furthermore, "collective output" and "stamp" are variable functions and the specific contents of functions are determined based on variable function information.

As described above, in intra-generation information, a function that is likely to be provided in each apparatus type is indicated for each generation, and a condition to be met to have the function is defined by a support condition. Furthermore, for a variable function, information indicating that the function is a variable function is added within intra-generation information.

Explanation of Variable Function Information

Next, variable function information will be explained. FIG. 5 is a diagram illustrating an example of variable function information. In this example, in variable function information, variants indicating the specific contents of functions of each variable function are set. A variable function is a collection of plural variants. Individual variants in a variable function have close but not the same contents of functions.

In the example illustrated in FIG. 5, the collective output function represented by "collective output" and the stamp function represented by "stamp" are defined as variable functions, and a "variant 1" and a "variation 2" are set as variants. Furthermore, a selection condition is defined as a condition for determining which one of plural variants is to be selected for a variable function by each apparatus type.

For example, for the collective output function represented by "collective output", "four pages" as a variant "1", that is, a function for collectively outputting four pages onto a single sheet of paper, is indicated. Furthermore, "eight pages" as a variant "2", that is, a function for collectively outputting eight pages onto a single sheet of paper, is indicated. Furthermore, as selection conditions, a condition that an apparatus type of the generation "1" should select the variant 1 "four pages" and a condition that an apparatus type of the generation "2" or "3" should select the variant 2 "eight pages" are illustrated. In this example, an apparatus type for which the variant 1 "four pages" is determined to be selected is able to output four pages or less (that is, two pages, four pages, etc.) onto a single sheet of paper, with the use of the collective output function. Furthermore, an apparatus type for which the variant 2 "eight pages" is determined to be selected is able to output eight pages or less (that is, two pages, four pages, eight pages, etc.) onto a single sheet of paper, with the use of the collective output function.

Furthermore, for example, for the stamp function represented by "stamp", "for color" as a variant 1, that is, a function for adding a predetermined image in color to paper, is indicated. Moreover, "for monochrome" as a variant 2, that is, a function for adding a predetermined image in black and white to paper, is indicated. As selection conditions, a condition that an apparatus type for which the item "color/monochrome" in inter-type difference information indicates "color" should select the variant 1 "for color" and a condition that an apparatus type for which the item "color/monochrome" in inter-type difference information indicates "monochrome" should select the variant 2 "for monochrome" are set. In this example, an apparatus type for which the variant 1 "for color" is determined to be selected is able to add a predetermined image in color or black and white to paper, with the use of the stamp function. Meanwhile, an apparatus type for which the variant 2 "for monochrome" is determined to be selected is not able to add a predetermined image in color to paper but is able to add a predetermined image in black and white to paper, with the use of the stamp function.

As described above, in variable function information, variants indicating more specific contents of functions are set for a variable function represented in intra-generation information. By applying a selection condition based on the contents of inter-type difference information, a variant to be selected for each apparatus type is determined.

Process for Determining Function Provided in Image Forming Apparatus

Next, a process performed by the terminal apparatus 10 to determine a function provided in the image forming apparatus 20, based on the inter-type difference information, the intra-generation information, and the variable function information will be explained. FIG. 6 is a flowchart illustrating an example of a process for determining a function provided in the image forming apparatus 20. For example, a case where the inter-type difference information illustrated in FIG. 3, the intra-generation information illustrated in FIG. 4, and the variable function information illustrated in FIG. 5 are used will be explained below.

First, the function display unit 112 receives, as an operation input from a user, an operation input for selecting the apparatus type of an image forming apparatus 20 to be used by the user (step S101). When the apparatus type is selected (hereinafter, the apparatus type selected by the user will be referred to as a selected apparatus type), the function display unit 112 determines, from inter-type difference information stored in the inter-type difference information storage unit 114, inter-type difference information corresponding to the selected apparatus type (step S102). Next, the function display unit 112 identifies a generation to which the selected apparatus type belongs, based on information of the generation included in the determined inter-type difference information. Then, the function display unit 112 determines the intra-generation information management unit 113 corresponding to the identified generation (step S103).

FIG. 7 is a diagram for explaining an example of intra-generation information corresponding to a selected apparatus type. For example, in the case where the selected apparatus type is the apparatus type A, first, inter-type difference information corresponding to the apparatus type A is determined from the inter-type difference information illustrated in FIG. 3. Then, based on the inter-type difference information for the apparatus type A, the generation "1" is identified as the generation to which the apparatus type A belongs. Next, the intra-generation information management unit 113 corresponding to the generation "1" is determined, and the intra-generation information 1 is determined as intra-generation information for the generation "1" from the intra-generation information illustrated in FIG. 4. The example illustrated in FIG. 7 indicates that the intra-generation information for the apparatus type A is the intra-generation information 1. In the case where a different apparatus type is selected, similar processing is performed, an intra-generation information management unit 113 corresponding to the selected apparatus type is determined, and intra-generation information corresponding to the selected apparatus type is determined, as illustrated in FIG. 7.

After the processing of step S103, the intra-generation information management unit 113 determines, based on the inter-type difference information of the selected apparatus type and the intra-generation information of the generation to which the selected apparatus type belongs, a function supported by the selected apparatus type from among all the functions defined to be likely to be provided in the image forming apparatuses 20 (step S104). Here, the intra-generation information management unit 113 determines, from among all the functions, a function that is likely to be provided in the image forming apparatus 20 of the generation to which the apparatus type belongs. Furthermore, for a determined function for which a support condition is set, the intra-generation information management unit 113 determines, by applying the support condition in accordance with the inter-type difference information of the selected apparatus type, whether or not the selected apparatus type has the function.

FIG. 8 is a diagram for explaining an example of a function provided in a selected apparatus type. For example, in the case where the selected apparatus type is the apparatus type B, functions provided in the apparatus type B are determined based on the inter-type difference information for the apparatus type B illustrated in FIG. 3 and the intra-generation information for the apparatus type B illustrated in FIG. 4 (that is, the intra-generation information 1). Since a circle mark is found in "size", "color mode", "collective output", and "FAX" in the intra-generation information 1, the apparatus type B is likely to have these functions. However, for "color mode" and "FAX", the condition 1 and the condition 2 are set, respectively, as support conditions.

When the condition 1 is applied to the inter-type difference information for the apparatus type B, since the item "color/monochrome" for the apparatus type B indicates "monochrome", the condition 1 is not met. Therefore, the apparatus type B does not have the "color mode" function. When the condition 2 is applied to the inter-type difference information for the apparatus type B, since the item "MFP/SFP" for the apparatus type B indicates "MFP", the condition 2 is met. Therefore, the apparatus type B has the "FAX" function. As a result, the example illustrated in FIG. 8 indicates that the apparatus type B has the "size" function, the "collective output" function, and the "FAX" function. In the case where a different apparatus type is selected, similar processing is performed, and a function provided in the selected apparatus type is determined, as illustrated in FIG. 8.

After the processing of step S104, the intra-generation information management unit 113 determines whether or not the functions provided in the selected apparatus type include a variable function (step S105). In the case where a variable function is not included (No in step S105), since all the functions supported by the selected apparatus type are determined, the process ends. Meanwhile, in the case where a variable function is included (Yes in step S105), the intra-generation information management unit 113 determines, based on the inter-type difference information for the selected apparatus type and the variable function information stored in the function information storage unit 115, a variant of the variable function provided in the selected apparatus type (step S106). Here, the intra-generation information management unit 113 determines, by applying a selection condition set in the variable function information in accordance with the inter-type difference information for the selected apparatus type, a variant corresponding to the selected apparatus type. When a variant is determined for each of the variable functions, since all the functions supported by the selected apparatus type are determined, the process ends.

FIG. 9 is a diagram for explaining an example of a variable function provided in a selected apparatus type. A function provided in each apparatus type is determined as illustrated in FIG. 8, where the "collective output" function and the "stamp" function are variable functions. Therefore, for example, in the case where the selected apparatus type is the apparatus type G, the contents of a function of a variable function provided in the apparatus type G are determined based on the inter-type difference information for the apparatus type G illustrated in FIG. 3 and the variable function information illustrated in FIG. 5. For the "collective output" function, when a selection condition set in the variable function information illustrated in FIG. 5 is applied to the inter-type difference information for the apparatus type G, since the apparatus type G is in its generation "3", the variant 2 "eight pages" is determined.

Furthermore, for the "stamp" function, when a selection condition set in the variable function information is applied to the inter-type difference information for the apparatus type G, since the item "color/monochrome" of the apparatus type G indicates "color", the variant 1 "for color" is determined. Therefore, FIG. 9 illustrates that "collective output" and "stamp" for the apparatus type G are "eight pages" and "for color", respectively. In the case where a different apparatus type is selected, similar processing is performed, and a variant of a variable function for the selected apparatus type is determined, as illustrated in FIG. 9.

As described above, a function supported by the image forming apparatus 20 is determined, based on the inter-type difference information, the intra-generation information, and the variable function information. FIG. 10 is a diagram illustrating an example of specifications of apparatus types of the image forming apparatuses 20. As explained in FIGS. 7 to 9, when a process is performed for each apparatus type as illustrated in FIG. 6, functions provided in individual apparatus types are determined as illustrated in FIG. 10. After the flow of the process is completed, the function display unit 112 displays a screen for executing printing with a function supported by the image forming apparatus 20, based on the function determined by the intra-generation information management unit 113. Furthermore, a user performs selection of a function to be used for printing, based on the contents displayed by the function display unit 112, and the like. Then, when the user performs an operation for performing printing, the printing processing unit 111 generates a print job. When the generated print job is transmitted to the image forming apparatus 20, printing processing is performed by the image forming apparatus 20.

Figure 11A:
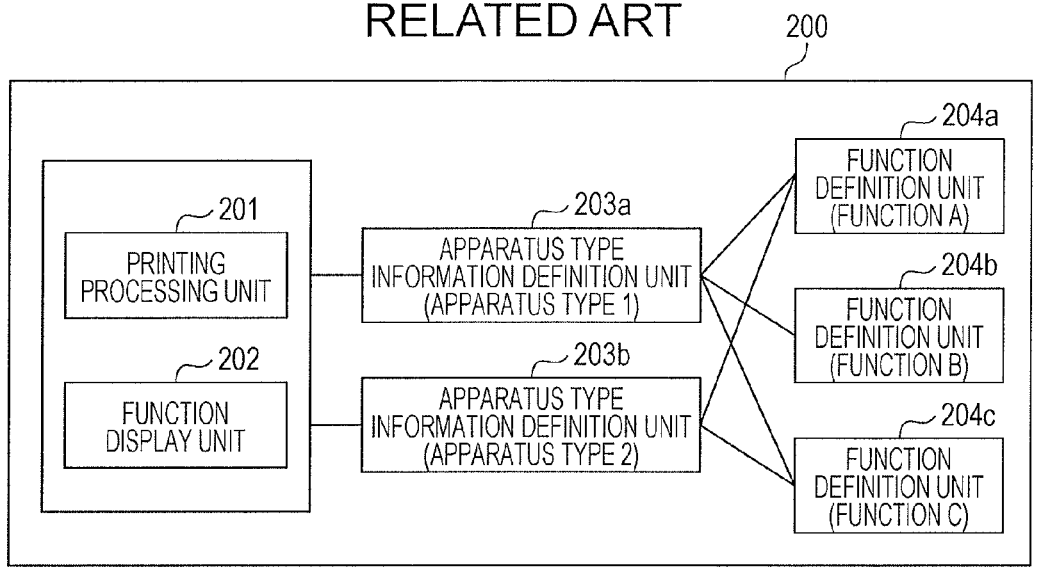
FIGS. 11A and 11B are diagrams for explaining examples of a known universal driver.
Figure 11B:
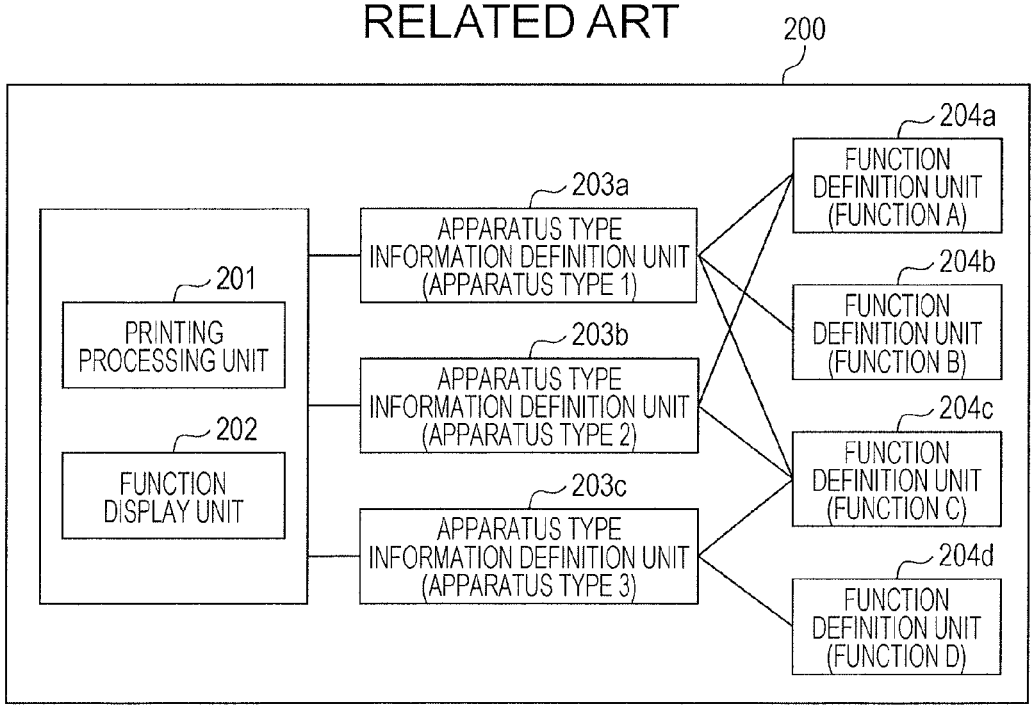

A known universal printer which supports plural apparatus types is configured, for example, as illustrated in FIGS. 11A and 11B. FIGS. 11A and 11B are diagrams for explaining examples of a known universal driver 200. The known universal driver 200 includes, for example, a printing processing unit 201, a function display unit 202, an apparatus type information definition unit 203, and a function definition unit 204. The printing processing unit 201 performs processing similar to that performed by the printing processing unit 111 according to an exemplary embodiment, and the function display unit 202 performs processing similar to that performed by the function display unit 112 according to an exemplary embodiment. Therefore, explanation for those similar units will be omitted.

The apparatus type information definition unit 203 exists for each apparatus type of the image forming apparatus 20 and stores information which defines a list of functions provided in the apparatus type of the image forming apparatus 20.

The function definition unit 204 exists for each function of the image forming apparatus 20 and stores information which defines the contents of the function provided in the image forming apparatus 20.

In the example illustrated in FIG. 11A, the apparatus type information definition unit 203a defines that the image forming apparatus 20 of the "apparatus type 1" has the "function A", the "function B", and the function "C", and the apparatus type information definition unit 203b defines that the image forming apparatus 20 of the "apparatus type 2" has the "function A" and the "function C". Furthermore, the function definition unit 204a defines the contents of the "function A", the function definition unit 204b defines the contents of the "function B", and the function definition unit 204c defines the contents of the "function C".

After the universal driver is released to the market, if the universal driver is caused to support a new type of the image forming apparatus 20, the apparatus type information definition unit 203 and the function definition unit 204 for the new apparatus type are added. FIG. 11B is a diagram for explaining an example of the known universal driver 200 when the universal driver 200 is caused to support a new apparatus type.

In the example illustrated in FIG. 11B, as a new apparatus type, an "apparatus type 3" defined by the apparatus type information definition unit 203c is added. The image forming apparatus 20 of the "apparatus type 3" has the "function C" and the function "D". The function definition unit 204c defines the contents of the "function C", and the function definition unit 204d defines the contents of the "function D". In the case of the known universal driver, for example, when the apparatus type information definition unit 203c is newly added by addition of the new apparatus type, the printing processing unit 201 and the function display unit 202, which are provided commonly to the individual apparatus types, are required to be updated in order to support the newly added apparatus type information definition unit 203c. In this case, the printing processing unit 201 and the function display unit 202 which have been updated are required to continuously support the existing apparatus type information definition unit 203 (for example, the apparatus type information definition unit 203a and the apparatus type information definition unit 203b) and the existing function definition unit 204 (for example, the function definition units 204a, 204b, and 204c), and an operation for operation guarantee is performed to verify if support is possible. The amount of such an operation for operation guarantee increases as the number of apparatus types of the image forming apparatuses 20 (that is, the number of apparatus type information definition units 203) increases.

Furthermore, a function change caused by addition of a new apparatus type causes the definition of the existing function definition unit 204 to be changed. The function change mentioned above represents, for example, an increase in the number of set items for a function and a change in the preset value of a set item. That is, in the example illustrated in FIG. 11B, when a function change occurs in the existing "function C" in accordance with addition of the "apparatus type 3" defined by the apparatus type information definition unit 203c, the definition of the function definition unit 204c changes. Therefore, the "apparatus type 1" and the "apparatus type 2" that originally have the "function C" are affected by the function change.

Furthermore, for example, when a function change occurs in the existing "function C" in accordance with addition of the "apparatus type 3", apart from the function definition unit 204c, for example, a function definition unit 204c1 (not illustrated) which defines a new "function C1" may be added. However, in this case, although the newly added function definition unit 204c1 is the same function as the existing function definition unit 204c, different function definition units 204 exist. Therefore, the function definition units 204 are not treated uniformly, and therefore, for example, storage capacity resources are wasted.

In contrast, in an exemplary embodiment, in the case where a new function is added, the new function is additionally defined, without changing the existing function in the function information storage unit 115. Even in the case where the contents and behavior of the existing function change, the existing function is not changed but a new function is derived and then added. Furthermore, intra-generation information is completely separated between generations. Therefore, addition of an apparatus type of a new generation does not affect intra-generation information of an existing generation, and the behavior of an existing apparatus type is maintained without any change. The printing processing unit 111 and the function display unit 112 that are provided commonly to individual apparatus types of the image forming apparatuses 20 do not handle apparatus type information for each apparatus type as in the known apparatus type information definition unit 203 but communicate with the intra-generation information management unit for each generation.

As described above, intra-generation information is completely separated between generations. Therefore, addition of an apparatus type of a new generation does not affect intra-generation information of an existing generation, and the behavior of an existing apparatus type is maintained without any change. Addition of a new apparatus type and a function of the new apparatus type do not affect a function used by an existing apparatus type within the inter-type difference information storage unit 114, the intra-generation information management unit 113, and the function information storage unit 115. Therefore, in the case where implementation of the printing processing unit 111 and the function display unit 112 is changed to support a new function and a new apparatus type, compared to a known configuration in which operation guarantee is performed, among the apparatus type information definition units 203 that exist for individual apparatus types, for verifying if individual functions of the apparatus types normally operate, the configuration according to this exemplary embodiment does not require to verify all the functions for all the apparatus types but may verify all the functions for an existing generation. As a result, the amount of operation for operation guarantee of an existing apparatus type by addition of a new function and new apparatus type may be reduced.

The term "function" mentioned above includes "prohibition" indicating a constraint, such as a cooperation/exclusion relationship between printing settings, and a UI including a dialog for allowing a user to operate printing settings and setting elements (control) within the dialog. That is, in this exemplary embodiment, display by the function display unit 112 is performed based on the function information storage unit 115 and the intra-generation information management unit 113.

Furthermore, it may be assumed that the printing processing unit 111 is shared between generations. When a pair of one or more printing settings and a print job is stored, by comparing print jobs based on predetermined printing settings after a new function is added or the like, it is verified that no unpredictable change has occurred in the printing processing unit 111. That is, in this exemplary embodiment, in the case where implementation of the printing processing unit 111 has been changed to support a new function and a new apparatus type, by comparing print jobs before and after the change in the implementation for the individual functions of an existing generation, operation guarantee for the existing apparatus type for the printing processing unit 111 is performed.

Furthermore, in this exemplary embodiment, variants which involve plural different behaviors are treated as a single variable function, and the plural variants do not affect each other. In the case where a function change occurs in an existing function, by defining a variant different from the original definition, the contents of the function after the function change occurs are treated as a different variant, without changing the original definition. As described above, since the original definition is not changed, for example, even if a function change occurs in accordance with addition of a new apparatus type, the contents of the originally existing function are maintained without being affected by the function change and without changing the behavior of the existing apparatus type. Furthermore, variants which involve different behaviors are uniformly treated as a single variable function, and wasting of resources is reduced.

Hardware Configuration of Terminal Apparatus

Figure 12:
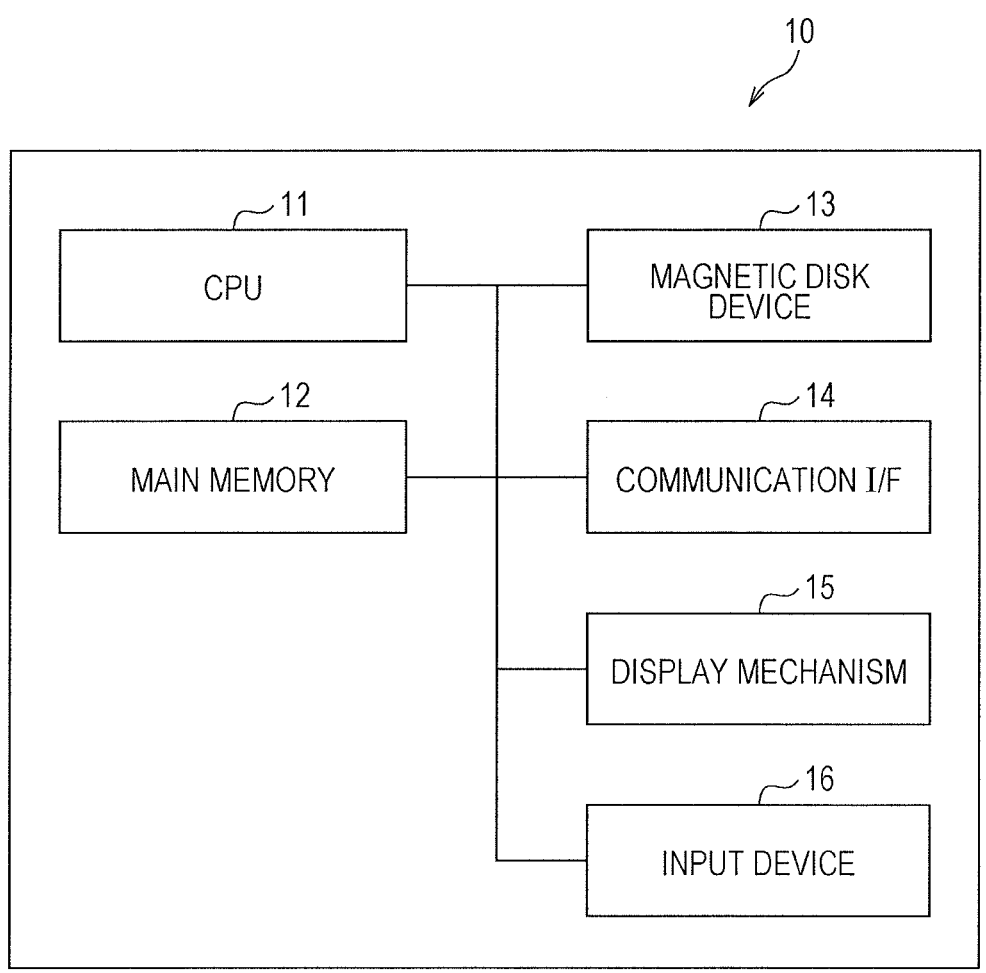
FIG. 12 is a diagram illustrating an example of a hardware configuration of a terminal apparatus according to an exemplary embodiment.

Finally, a hardware configuration of the terminal apparatus 10 will be explained. FIG. 12 is a diagram illustrating an example of the hardware configuration of the terminal apparatus 10 according to an exemplary embodiment. As illustrated in FIG. 12, the terminal apparatus 10 includes a central processing unit (CPU) 11 serving as an arithmetic operation unit, and a main memory 12 and a magnetic disk device (hard disk drive (HDD)) 13 serving as a storage unit. The CPU 11 executes various programs, such as an operation system (OS), an application, and the printer driver 102, and implements the individual function units of the terminal apparatus 10 described above. Furthermore, the main memory 12 is a storage region in which various programs, data to be used for execution of the various programs, and the like are stored. The magnetic disk device 13 is a storage region in which input data to the various programs, output data from the various programs, and the like are stored. The terminal apparatus 10 also includes a communication I/F 14 for communicating with an external apparatus, the display mechanism 15 including a video memory, a display, and the like, and an input device 16, such as a keyboard and a mouse.

A program for implementing an exemplary embodiment of the present invention is not only provided by a communication unit but also able to be stored in a recording medium such as a CD-ROM and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing instruction apparatus, comprising:
   a definition unit configured to define a function of a printing apparatus;
   a group storage unit configured to store, for each of groups of printing apparatuses categorized in accordance with a predetermined rule, function information indicating a function provided in a printing apparatus which belongs to a group of the groups of printing apparatuses, from among functions defined by the definition unit;
   a difference storage unit configured to store difference information indicating a group to which an apparatus type belongs and a difference between apparatus types of printing apparatuses and functions of the printing apparatuses; and
   a determination unit configured to determine a function of the apparatus type, based on the function information corresponding to the apparatus type which is identified by the group indicated by the difference information.

2. The printing instruction apparatus according to claim 1,
   wherein the function information indicates a function which is provided in the printing apparatus belonging to the group and defines a condition to be met by the printing apparatus of the apparatus type to have the function, and
   wherein the determination unit is configured to apply the condition set for the function information to the difference information to determine a function of the apparatus type.

3. The printing instruction apparatus according to claim 1, further comprising:
a variable function storage unit configured to store, as a function indicated by the function information, variable function information which defines a variable function including contents of a plurality of different functions,
wherein when the printing apparatus of the apparatus type has the variable function, the variable function information defines a condition for determining contents of a function from among the contents of the plurality of functions in the variable function, and
wherein when it is determined that the apparatus type has the variable function, the determination unit is configured to apply the condition set for the variable function information to the difference information to determine contents of a function of the variable function provided in the apparatus type.

4. The printing instruction apparatus according to claim 2, further comprising:
a variable function storage unit configured to store, as a function indicated by the function information, variable function information which defines a variable function including contents of a plurality of different functions,
wherein when the printing apparatus of the apparatus type has the variable function, the variable function information defines a condition for determining contents of a function from among the contents of the plurality of functions in the variable function, and
wherein when it is determined that the apparatus type has the variable function, the determination unit is configured to apply the condition set for the variable function information to the difference information to determine contents of a function of the variable function provided in the apparatus type.

5. The printing instruction apparatus according to claim 1, further comprising:
a display configured to display a screen for executing printing with the function determined by the determination unit; and
a printing instruction unit configured to issue an instruction to perform printing with the function determined by the determination unit.

6. The printing instruction apparatus according to claim 2, further comprising:
a display configured to display a screen for executing printing with the function determined by the determination unit; and
a printing instruction unit configured to issue an instruction to perform printing with the function determined by the determination unit.

7. The printing instruction apparatus according to claim 3, further comprising:
a display configured to display a screen for executing printing with the function determined by the determination unit; and
a printing instruction unit configured to issue an instruction to perform printing with the function determined by the determination unit.

8. The printing instruction apparatus according to claim 4, further comprising:
a display configured to display a screen for executing printing with the function determined by the determination unit; and
a printing instruction unit configured to issue an instruction to perform printing with the function determined by the determination unit.

9. A printing system comprising:
a printing apparatus configured to print an image on a recording medium; and
a printing instruction apparatus configured to instruct the printing apparatus to print an image,
wherein the printing instruction apparatus includes:
a definition unit configured to define a function of the printing apparatus,
a group storage unit configured to store, for each of groups of printing apparatuses categorized in accordance with a predetermined rule, function information indicating a function provided in a printing apparatus which belongs to a group of the groups, from among functions defined by the definition unit,
a difference storage unit configured to store difference information indicating a group to which an apparatus type belongs and a difference between types of printing apparatuses and functions of the printing apparatuses, and
a determination unit configured to determine a function of the apparatus type, based on the function information corresponding to the apparatus type which is identified by the group indicated by the difference information.

10. A printing instruction method comprising:
defining, performed by at least one processor, a function of a printing apparatus;
storing, performed by the at least one processor, for each of groups of printing apparatuses categorized in accordance with a predetermined rule, function information indicating a function provided in a printing apparatus which belongs to a group of the groups, from among defined functions;
storing, performed by the at least one processor, difference information indicating a group to which an apparatus type belongs and a difference between apparatus types of printing apparatuses and functions of the printing apparatuses; and
determining, performed by the at least one processor, a function of the apparatus type, based on the function information corresponding to the apparatus type which is identified by the group indicated by the difference information.

11. A non-transitory computer readable medium storing a program causing a computer to execute a process for printing instruction, the process comprising:
defining a function of a printing apparatus;
storing, for each of groups of printing apparatuses categorized in accordance with a predetermined rule, function information indicating a function provided in a printing apparatus which belongs to a group of the groups, from among defined functions;
storing difference information indicating a group to which an apparatus type belongs and a difference between apparatus types of printing apparatuses and functions of the printing apparatuses; and
determining a function of the apparatus type, based on the function information corresponding to the apparatus type which is identified by the group indicated by the difference information.

* * * * *